US007899215B2

(12) United States Patent
Sato

(10) Patent No.: US 7,899,215 B2
(45) Date of Patent: Mar. 1, 2011

(54) IN VIVO IDENTIFICATION INFORMATION CREATION APPARATUS AND IDENTIFICATION APPARATUS

(75) Inventor: Hideo Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 1463 days.

(21) Appl. No.: 11/007,324

(22) Filed: Dec. 9, 2004

(65) Prior Publication Data

US 2005/0143661 A1 Jun. 30, 2005

(30) Foreign Application Priority Data

Dec. 24, 2003 (JP) .............................. 2003-428407

(51) Int. Cl.
 G06K 9/00 (2006.01)
 G06K 9/46 (2006.01)
 G06K 9/66 (2006.01)
 A61B 6/00 (2006.01)
(52) U.S. Cl. ..................... 382/115; 382/190; 600/473
(58) Field of Classification Search .................. 382/115
 See application file for complete search history.

(56) References Cited

U.S. PATENT DOCUMENTS

| 4,790,564 | A | 12/1988 | Larcher et al. | |
| 6,320,641 | B1 * | 11/2001 | Bauer et al. | ................... 355/18 |
| 2003/0169907 | A1 * | 9/2003 | Edwards et al. | ............. 382/118 |

FOREIGN PATENT DOCUMENTS

| EP | 0 650 137 A2 | 4/1995 |
| EP | 1 187 055 A2 | 3/2002 |
| JP | 2-191083 | 7/1990 |
| JP | 9-81727 | 3/1997 |
| WO | WO 97/21188 | 6/1997 |
| WO | WO 03/002013 A1 | 1/2003 |

OTHER PUBLICATIONS

Cross et al.; Thermographic Imaging of the Subcutaneous Vascular Network of the Back of the Hand for Biometric Identification, Security in Technology Proceedings, 1995, p. 20-35.*
J. M. Cross, et al., "Thermographic Imaging of the Subcutaneous Vascular Network of the Back of the Hand for Biometric Identification", Security Technology, Proceedings, Institute of Electrical and Electronics Engineers 29th Annual International Carnahan Conference, XP-010196386, Oct. 18, 1995, pp. 20-35.
Patent Abstracts of Japan, JP 09-081727, Mar. 28, 1997.

* cited by examiner

*Primary Examiner*—Tom Y Lu
*Assistant Examiner*—Thomas A Conway
(74) *Attorney, Agent, or Firm*—Oblon, Spivak, McClelland, Maier & Neustadt, L.L.P.

(57) ABSTRACT

To propose an identification information creation apparatus offering improved reliability. This invention provides: an imaging means for imaging a unique in vivo imaging target existing inside a body; an optimization means for adjusting the imaging condition of the imaging means to be optimal for the in vivo imaging target and/or applying an image process so that the image condition of an image taken by the imaging means becomes optimal; and an identification information creation means for creating a first parameter which is set in the imaging means as a result of the adjustment by the optimization means and/or a second parameter which is obtained as a result of applying the image process by the optimization means, as identification information to identify the body.

20 Claims, 7 Drawing Sheets

IN VIVO IDENTIFICATION INFORMATION CREATION APPARATUS AND IDENTIFICATION APPARATUS

BACKGROUND OF THE INVENTION

1. Field of the Invention

This invention relates to an identification information creation apparatus and an identification apparatus, and is suitably applied to a case of performing biometrics identification.

2. Description of the Related Art

A number of identification apparatuses using the fingerprints of a body as a target of biometrics identification have been proposed. Recently, a blood vessel formation pattern of blood vessels of a body is attracted as a target of the biometrics identification, and therefore identification apparatuses using the blood vessel formation pattern as identification information have been proposed (refer to "Weekly Bio" 49th edition, venous blood matching apparatus, [online], [search on Jan. 24, 2003], Internet <URL:http//www.mackport.co.jp/WEEKLY-BIO/bio49/bio.049.htm>).

In the identification apparatuses of this kind, by using such a feature that light of near-infrared light bandwidth is specifically absorbed in deoxygenization hemoglobin (venous blood) in blood vessels and scattered light obtained by irradiating a body with near-infrared light can be obtained as a blood vessel pattern light representing the formation pattern of the blood vessel tissues, a blood vessel image signal is created from the blood vessel pattern light and the blood vessel formation pattern extracted from the blood vessel image is used as identification information.

In the identification apparatuses of this kind, however, in a blood vessel image obtained by performing photoelectric conversion on blood vessel pattern light obtained via a body, since the path and so on of the scattered light of the near-infrared light inside the body are individually different, blood vessel tissues which are an imaging target cannot be represented correctly, as shown in FIG. 1, which arises a problem in that identification information has poor reliability.

SUMMARY OF THE INVENTION

In view of foregoing, an object of this invention is to provide an identification information creation apparatus and method capable of enhancing reliability of identification information and an identification apparatus and method capable of improving accuracy of an identification process.

The foregoing objects and other objects of the invention have been achieved by the provision of an identification information creation apparatus comprising: an imaging means for imaging a unique in vivo imaging target existing inside a body; an optimization means for adjusting the imaging condition of the imaging means to be optimal for the in vivo imaging target and/or applying an image process so that the image condition of an image taken by the imaging means becomes optimal; and an identification information creation means for creating a first parameter which is set in the imaging means as a result of the adjustment by the optimization means and/or a second parameter which is obtained as a result of the image process by the optimization means, as identification information to identify the body.

Further, this invention provides an identification information creation method comprising: an optimization step of adjusting the imaging condition of the imaging means to be optimal for a unique in vivo imaging target existing inside a body and/or applying an image process so that the image condition of an image taken by the imaging means becomes optimal; and an identification information creation step of creating a first parameter which is set in the imaging means as a result of the adjustment in the optimization step and/or a second parameter which is obtained as a result of the image process in the optimization step, as identification information to identify the body.

Furthermore, this invention provides an identification apparatus comprising: an imaging means for imaging a unique in vivo imaging target existing inside a body; an optimization means for adjusting the imaging condition of the imaging means to be optimal for the in vivo imaging target and/or applying an image process so that the image condition of an image taken by the imaging means becomes optimal; and an identification means for performing a prescribed identification process based on a first parameter set in the imaging means as a result of the adjustment by the optimization means and/or a second parameter obtained as a result of the image process by the optimization means.

Furthermore, this invention provides an identification method comprising: an optimization step of adjusting the imaging condition of an imaging means to be optimal for a unique in vivo imaging target existing inside a body and/or applying an image process so that the image condition of an image taken by the imaging means becomes optimal; and an identification step of performing a prescribed identification process based on a first parameter set in the imaging means as a result of the adjustment in the optimization step and/or a second parameter obtained as a result of the image process in the optimization step.

According to this invention, a first parameter which is set in an imaging means as a result of adjusting the imaging condition of the imaging means to be optimal for a unique in vivo imaging target existing inside a body and/or a second parameter which is obtained as a result of applying an image process so that the image condition of an image taken by the imaging means becomes optimal are created as identification information to identify the body. Therefore, since parameters for avoiding image quality deterioration which occurs in a result of imaging the in vivo imaging target depending on individuality of bodies are also used as information unique to the body, identification information which provides adaptive imaging condition for a body and can be used for identification can be created correctly, thus enhancing the reliability of the identification information.

Further, according to this invention, an identification process is performed based on a first parameter which is set in an imaging means as a result of adjusting the imaging condition of the imaging means to be optimal for a unique in vivo imaging target existing inside a body and/or a second parameter which is obtained as a result of applying an image process so that the image condition of an image taken by the imaging means becomes optimal. Therefore, since parameters for avoiding image quality deterioration which occurs in a result of imaging the in vivo imaging target depending on individuality of bodies are also used as information unique to the body, the identification process can be performed with the parameters which provides adaptive imaging condition for a body and can be used for identification, thus enhancing reliability of identification accuracy.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Construction of Identification Apparatus

Figure 1:
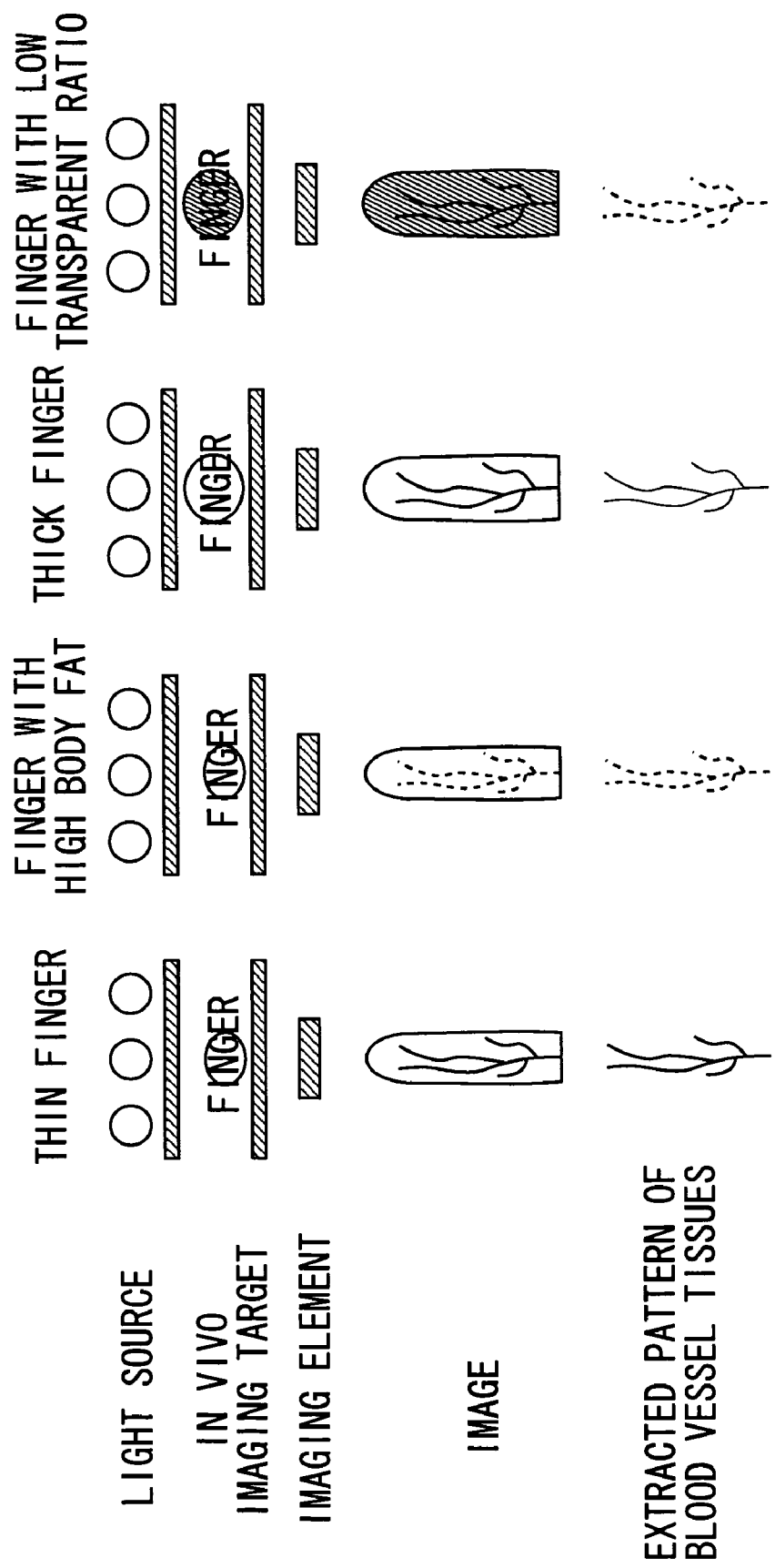
FIG. 1 is a schematic diagram explaining effects on imaging of blood vessel tissues that are caused depending on individuality.
Figure 2:
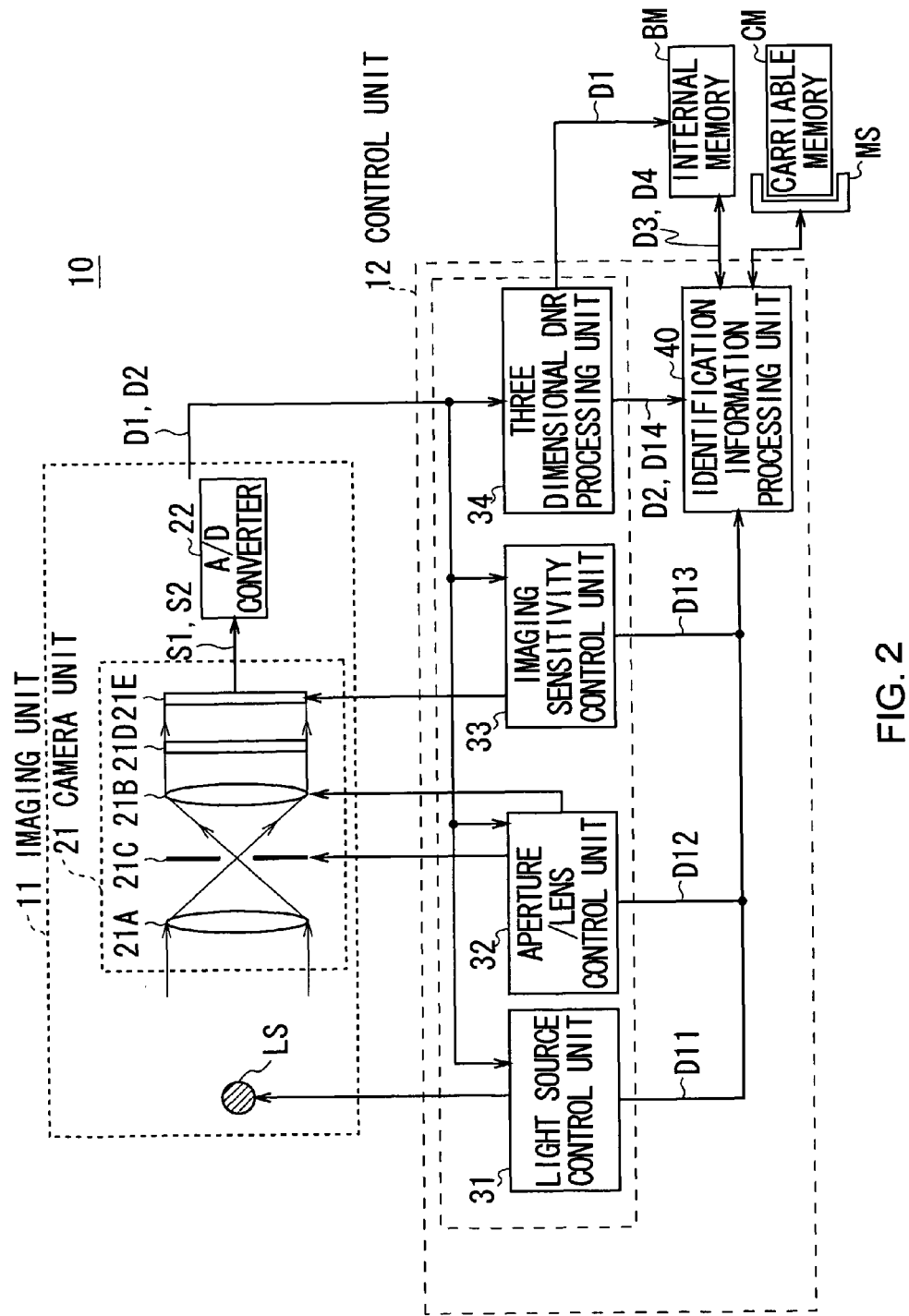
FIG. 2 is a schematic drawing showing the construction of an identification apparatus.

FIG. 2 shows an identification apparatus 10 according to this embodiment. This identification apparatus 10 is composed of an imaging unit 11 for imaging an imaging target and a control unit 12 for controlling the imaging unit 11, and executes a first mode (hereinafter, referred to as a normal imaging mode) for imaging subjects such as bodies and backgrounds as imaging targets.

In this case, the imaging unit 11 guides reflected light coming from a front subject, to a solid imaging element 21E such as a Charge Coupled Device (CCD) via a lens 21A, an aperture 21C, a lens 21B and an ultraviolet cut filter 21D in a camera unit 21 in order. In this connection, the ultraviolet cut filter 21D comprises an RGB filter for letting visible light and near-infrared light get through.

The solid imaging element 21E performs photoelectric conversion on the reflected light coming via the ultraviolet cut filter 21D, with photoelectric conversion elements, and reads a charge signal that is accumulated in the photoelectric conversion elements as a result, as a subject image signal S1 under a readout clock of a clock generator (not shown), and sends it to an Analog/Digital (A/D) converter 22.

The A/D converter 22 creates a digital subject image signal D1 by digitizing the subject image signal S1, and sends it to the control unit 12.

On the other hand, the control unit 12 has an imaging control unit 30 comprising a light source control unit 31, an aperture/lens control unit 32, an imaging sensitivity control unit 33 and a three-dimensional Digital Noise Reduction (DNR) processing unit 34, and an identification information processing unit 40. In the normal imaging mode, the control unit 12 starts only the aperture/lens control unit 32 and the three-dimensional DNR processing unit 34 of the imaging control unit 30 to execute various processes.

In actual, the aperture/lens control unit 32 performs an automatic exposure control process to control the aperture value of the aperture 21C based on the luminance level of the subject image of the digital subject image signal D1 received from the A/D converter 22, and sets the aperture value so that an optimal light amount of reflected light enters the solid imaging element 21E via an imaging target.

In addition, the aperture/lens control unit 32 executes an auto focus process to control the positions of the lens 21A and 21B based on a focus control signal included in the digital subject image signal D1, to set the lens positions so as to obtain an optimal focus distance and position for the imaging target.

The three-dimensional DNR processing unit 34 executes a three-dimensional DNR process to compose the digital subject image signal D1 with a composition result of a digital subject image signal D1 which was received from the A/D conversion unit 22 in the past, every time when receiving the digital subject image signal D1 from the A/D converter 22, so as to reduce the noise components (hereinafter, referred to as a noise component ratio) occupying the subject image, such as thermal noise of the solid imaging element 21E.

In this case, the three-dimensional DNR processing unit 34 performs the three-dimensional DNR process until the noise component ratio of the subject image becomes a preset prescribed threshold value or lower, and stores the digital subject image signal D1 of the threshold value or lower in an internal memory BM.

As described above, the identification apparatus 10 can execute the normal imaging mode and store images of subjects such as bodies and backgrounds, in the internal memory BM as digital subject image signals D1.

In addition to the above configuration, this identification apparatus 10 also executes a second mode (hereinafter, referred to as a blood vessel imaging mode) to image blood vessel tissues existing inside a body as an imaging target (hereinafter, referred to as in vivo imaging target).

Figure 3:
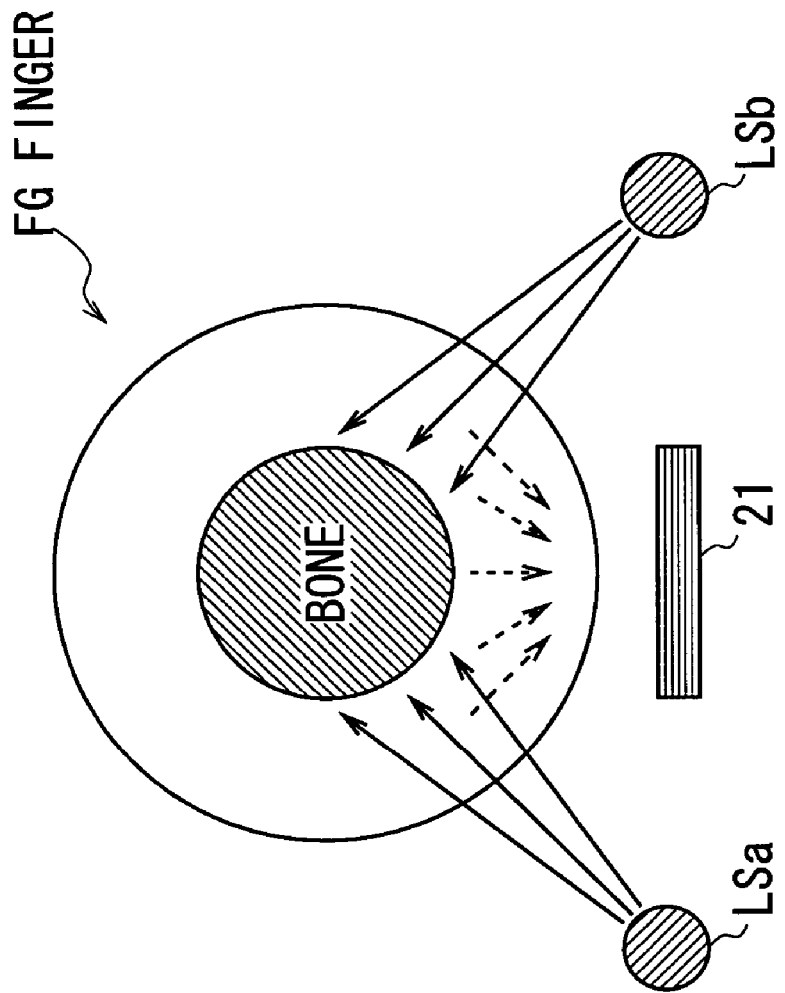
FIG. 3 is a schematic drawing showing an arrangement of near-infrared light sources and paths of near-infrared light.

In this case, for example, as shown in FIG. 3, in the imaging unit 11, near-infrared light sources LS (LSa and LSb) for emitting near-infrared light in a direction opposite to the outside light in the air entering the camera unit 21 are arranged at the almost same level as the camera unit 21 to irradiate a finger FG put in the irradiation direction with near-infrared light.

This near-infrared light is specifically absorbed in intrinsic hemoglobin in blood vessel tissues inside a finger FG, and gets through or is reflected by the other tissues. Therefore, scattered light obtained through the finger FG enters the camera unit 21 as blood vessel pattern light representing the formation pattern of the blood vessel tissues.

The camera unit 21 (FIG. 2) creates the blood vessel pattern light as a blood vessel image signal S2 via the lens 21A, the aperture 21C, the lens 21B, the ultraviolet cut filter 21D, and the solid imaging element 21E in order, and sends this to the control unit 12 as a digital blood vessel image signal D2 via the A/D converter 22.

In this blood vessel imaging mode, the control unit 12 starts the light source control unit 31, the imaging sensitivity control unit 33 and the identification information processing unit 40 in addition to the aperture/lens control unit 32 and the three-dimensional DNR processing unit 34 which operate in the normal imaging mode, to execute various processes.

Then the imaging control unit 30 of the control unit 12 executes an optimization process so that the imaging unit 11 is in optimal imaging condition for the in vivo imaging target and the image condition of the blood vessel image becomes optimal, based on the blood vessel image of the digital blood vessel image signal D2 received from the A/D converter 22.

In actual, the light source control unit 31 of the image control unit 30 executes an automatic light source control process to control the output value such as voltage to be output to the near-infrared light sources LS, based on the luminance level of the blood vessel image of the digital blood vessel image signal D2, in order to set the output value so that the near-infrared light sources LS emit near-infrared light of optimal luminance to the in vivo imaging target.

In this case, the light source control unit 31 can suppress the image quality deterioration which occurs in a blood vessel image depending on individuality other than the in vivo imaging target, such as the color of the finger FG and the amount of fat in the finger FG.

In addition, in the automatic light source control process, the light source control unit 31 sets an output value to be larger than an lower-limited output value which is preset so that the luminance of the near-infrared light emitted from the near-infrared light sources LS becomes the strength of the outside light normally obtained (for example, general luminance of visible light in a room) or greater.

Thereby, as shown in FIG. 3, the light source control unit 31 can attenuate the near-infrared light emitted from the near-infrared light sources LS, through the bones and so on of the finger FG, and gives it to the camera unit 21 as near-infrared light in which the outside light arriving at the camera unit 21 can be actually ignored.

In addition, the aperture/lens control unit 32 of the imaging control unit 30 executes the automatic exposure control process, as in the normal mode case, to set the aperture value so that an optimal light amount of blood vessel pattern light enters the solid imaging element 21E, and also performs the auto focus process, as in the normal mode case, to set the lens positions so as to obtain an optimal focus distance and positions for the in vivo imaging target (blood vessel tissues).

In this case, the aperture/lens control unit 32 can avoid image quality deterioration which occurs in a blood vessel image due to individuality other than the in vivo imaging target, such as the color of the finger FG and the amount of fat of the finger FG, and the depth of the in vivo imaging target in the body.

The imaging sensitivity control unit 33 of the imaging control unit 30 executes an exposure time control process (that is, electronic shutter) to electrically control a charge accumulation period for the amount of a charge signal being accumulated in the photoelectric conversion elements of the solid imaging element 21E based on the luminance level and so on of the blood vessel image of the digital blood vessel image signal D2, to adjust the imaging sensitivity of the solid imaging element 21E to the blood vessel pattern light.

Figures 4A, 4B:
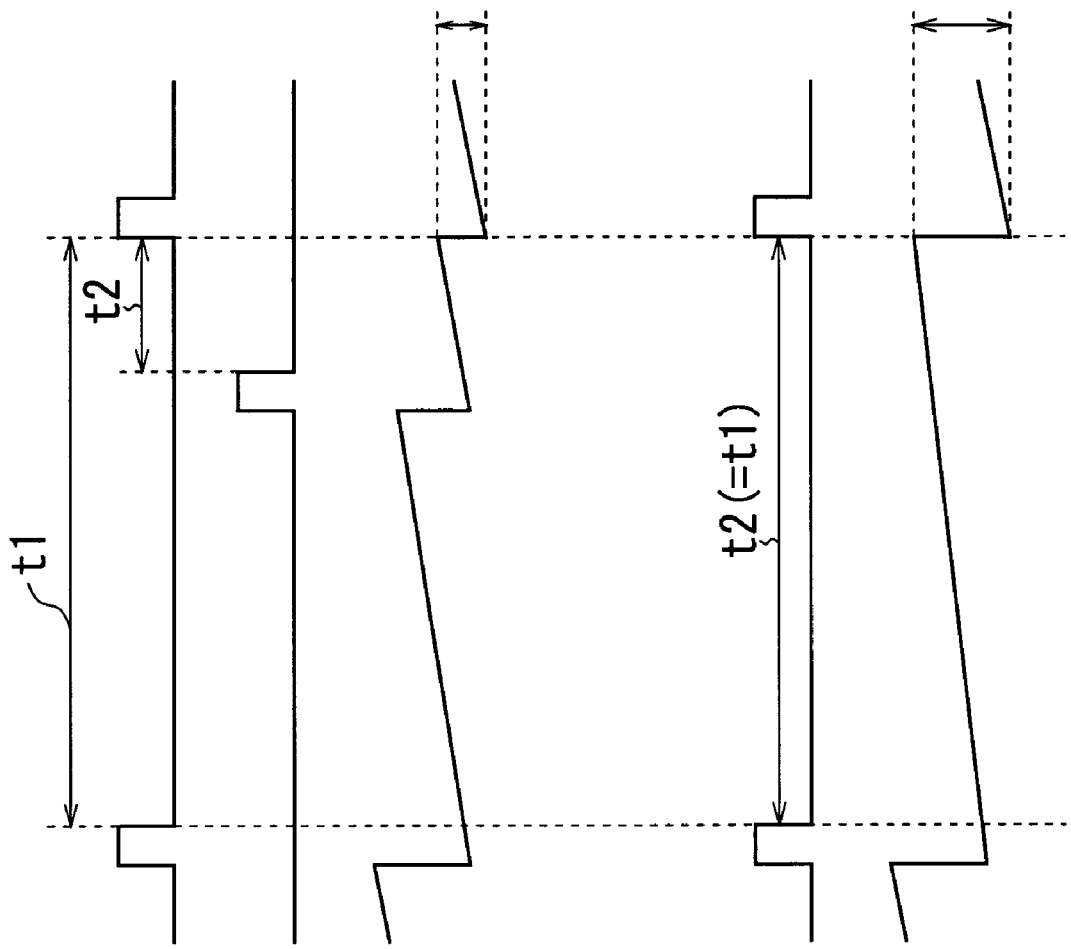
FIGS. 4A and 4B are schematic diagrams explaining electronic shutter.

Specifically, as shown in FIGS. 4A and 4B, the imaging sensitivity control unit 33 variably controls predetermined reset timing within the charge accumulation period t1 from falling of the readout clock to rising which indicates next readout timing, so as to obtain optimal imaging sensitivity of the solid imaging element 21E to blood vessel pattern light by making a period (hereinafter, referred to as exposure period) t2 (FIG. 4A) from the reset timing to the readout timing shorter than that of the normal imaging mode (FIG. 4B).

Figure 5A:
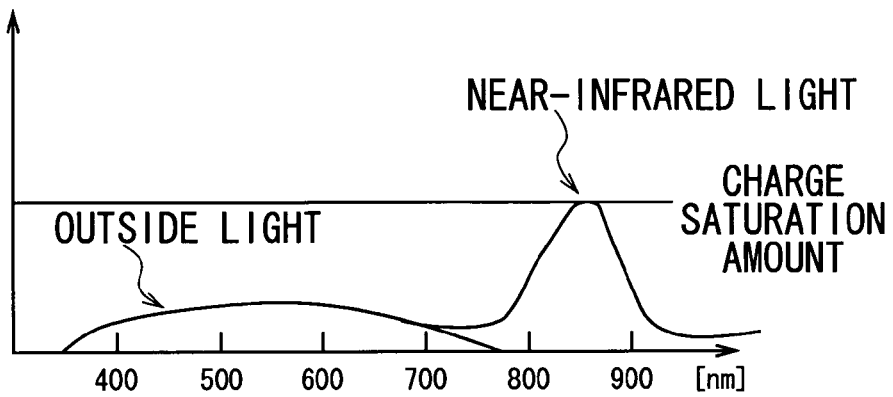
FIGS. 5A and 5B are schematic diagrams explaining adjustment of imaging sensitivity by the electronic shutter.
Figure 5B:
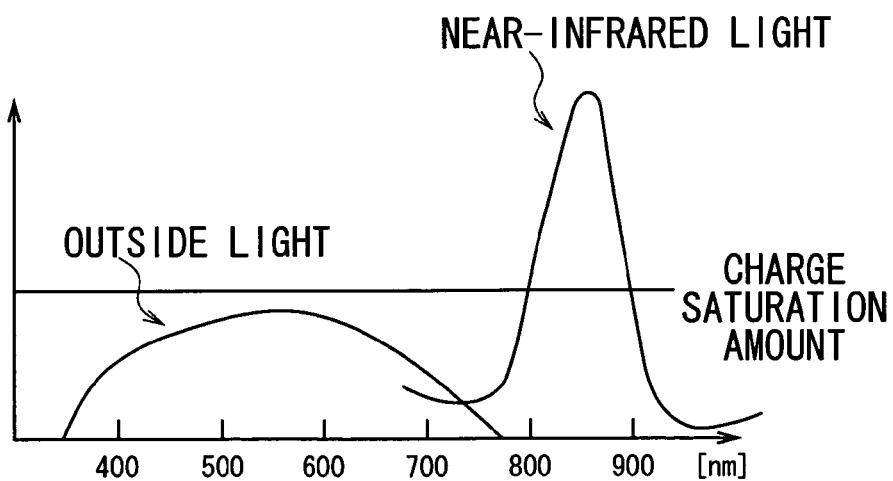

In this case, the imaging sensitivity control unit 33 can not only previously avoid such happening that the charge signal being accumulated in the photoelectric conversion elements is saturated within the charge accumulation period t1 (FIG. 5) because the luminance of near-infrared light emitted from the near-infrared light sources LS is larger than that of the outside light, as shown in FIG. 5A, but also can reduce only the imaging sensitivity of the solid imaging element 21E to the outside light by relatively reducing the amount of the charge signal which is accumulated in the photoelectric conversion elements as a result of the photoelectric conversion of the blood vessel pattern light and the outside light arriving at this time, as shown in FIG. 5B. In addition, in this case, the imaging sensitivity control unit 33 can prevent the image quality of a blood vessel image from deteriorating due to individuality other than the in vivo imaging target, such as the color of the finger FG and the amount of fat of the finger FG.

In addition, the three-dimensional DNR processing unit 34 of the imaging control unit 30 executes the three-dimensional DNR process until the noise component ratio of the digital blood vessel image signal D2 in the blood vessel image becomes a prescribed threshold value or lower, and sends the digital blood vessel image signal D2 (composition result) of the threshold value or lower to the identification information processing unit 40, as in the normal mode case.

In this case, the three-dimensional DNR processing unit 34 can prevent the image quality of the blood vessel image from deteriorating due to the solid imaging element 21E itself and individuality such as the reflecting path and transparent rate inside the finger FG.

In this way, the imaging control unit 30 executes the optimization process, to obtain as the digital blood vessel image signal D2 a high quality blood vessel image which correctly represents the individually different blood vessel tissues existing inside a body.

The identification information processing unit 40 of the control unit 12 extracts a unique blood vessel formation pattern from the blood vessel image of the digital blood vessel image signal D2. Then to register this blood vessel formation pattern, the identification information processing unit 40 creates first body identification information D3 from the blood vessel formation pattern to identify the body imaged this time, and stores it in the internal memory BM.

In this case, the extracted blood vessel formation pattern of the blood vessel tissues existing inside the body is difficult to be directly stolen from the body. This means that the identification information processing unit 40 can create the first body identification information D3 with high confidentiality as compared with a case of extracting a pattern of the fingerprints or the like on the body surface, as a registration target.

On the other hand, in executing the identification process, the identification information processing unit 40 compares a blood vessel formation pattern extracted this time with the blood vessel formation pattern of first body identification information D3 being registered.

Various set parameters (an output value to the near-infrared light sources LS, an aperture value of the aperture 21C, positions of the lens 21A and 21B, and reset timing of the solid imaging element 21E) set in the optimization process of the imaging control unit 30 and a processing parameter (that is, the number of times of the composition process applied to the digital blood vessel image signal D1 composed in the three-dimensional DNR process) obtained through the three-dimensional DNR process are values which are obtained as a result of adjustment in order to correctly represent individually different blood vessel tissues existing inside a body, and are adaptively controlled according to individuality such as the depth of the blood vessel tissues in the body. Therefore they have properties as unique information representing three dimensionality of the body.

Therefore, the control unit 12 of this embodiment uses the various parameters as second body identification information in addition to the blood vessel formation pattern.

In this case, the imaging control unit 30 sends to the identification information processing unit 40 the output value set through the automatic light source control process as set parameter data D11, the aperture value set through the automatic exposure control process and the lens positions set through the auto focus process as set parameter data D12, the reset timing set through the exposure time control process as the set parameter data D13, the number of times of the composition process obtained through the three-dimensional DNR process as processing parameter data D14.

Then, to register these parameters D11 to D14, the identification information processing unit 40 creates second body identification information D4 from the parameter data D11 to D14, and stores it in the internal memory BM in association with the first body identification information D3.

In executing the identification process, the identification information processing unit 40 sets the parts of the control unit 12 with the corresponding parameter data D11 to D14, and then compares the three-dimensional formation pattern extracted from the digital blood vessel image signal D2 obtained from the image unit 11 via the three-dimensional DNR processing unit 34 with the blood vessel formation pattern of the first identification information D3. Then when the comparison result is within a prescribed allowable range, the identification information processing unit 40 compares the parameter data D11 to D14 with the parameter data D11 to D14 of the second body identification information D4 being registered.

As described above, the identification apparatus 10 executes the blood vessel imaging mode, and not only registers and compares the in vivo imaging target (blood vessel tissues) itself as the first body identification information D1 but also can register and compare the results (set parameter data D11 to D13) of adjusting the imaging condition of the imaging unit 11 for the in vivo imaging target and the results (processing parameter data D14) of adjusting the image condition of the blood vessel image obtained by imaging the in vivo imaging target, as the second body identification information D4.

(2) Identification Information Creation Process

Figure 6:
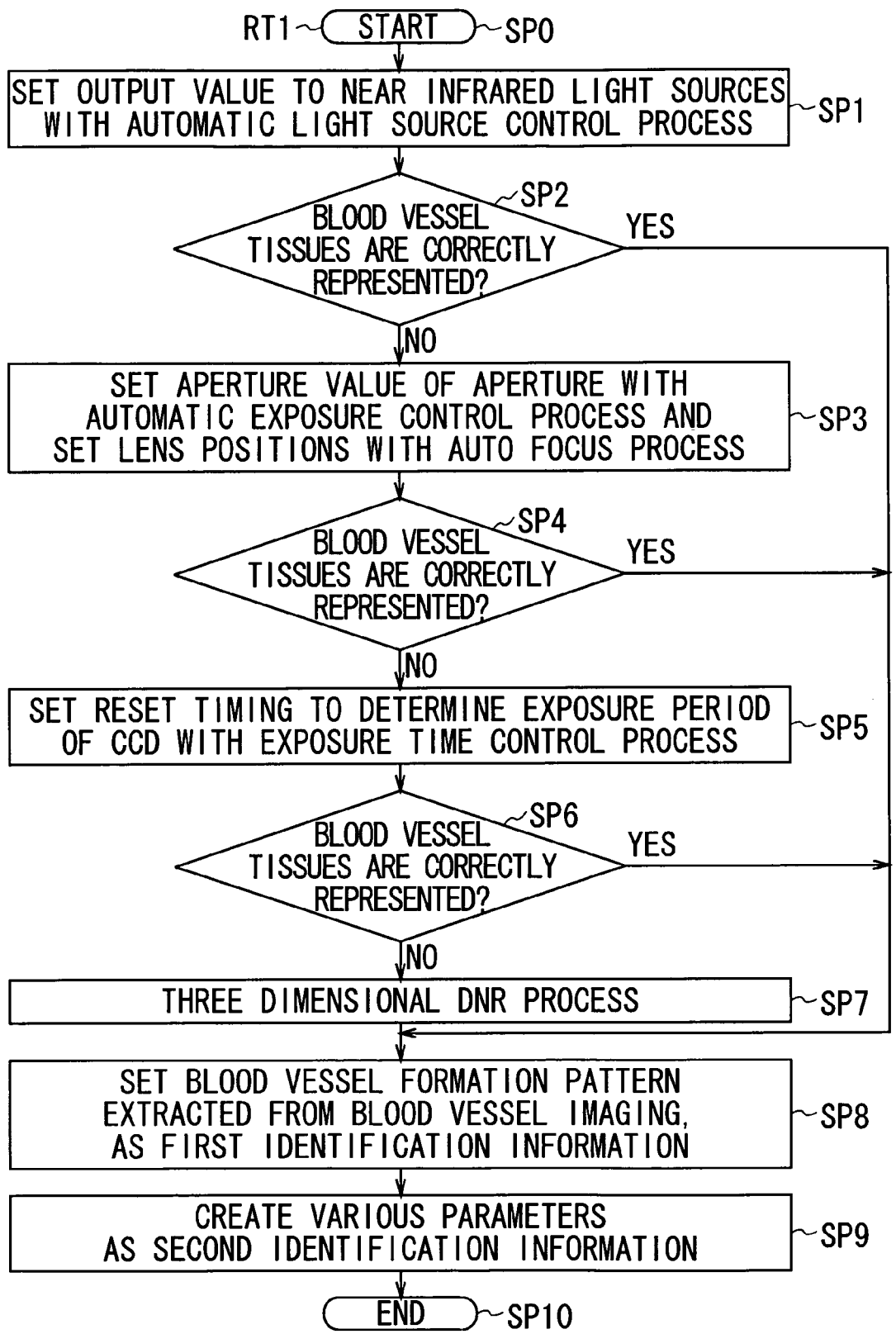
FIG. 6 is a flowchart showing an identification information creation procedure.

The identification information creation process to create the first body identification information D3 and the second body identification information D4 is executed with an identification information creation procedure RT1 shown in FIG. 6.

Upon reception of an identification information registration command from an operating unit (not shown), for example, the control unit 12 starts this identification registration procedure RT1 from step SP0. At step SP1, the control unit 12 executes the automatic light source control process to set an output value such as voltage to be output to the near-infrared light sources LS so as to obtain an optimal luminance level for an in vivo imaging target. At step SP2, the control unit 12 determines whether the blood vessel image of the digital blood vessel image signal D2 correctly represents the blood vessel tissues.

When a negative result is obtained here, at next step SP3, the control unit 12 executes the automatic exposure control process to set the aperture value of the aperture 21C so as to obtain an optimal luminance level for the in vivo imaging target, and also performs the auto focus process to set the positions of the lens 21A and 21B so as to obtain an optimal focus position and so on for the in vivo imaging target. At step SP4, the control unit 12 determines whether the blood vessel image of the digital blood vessel image signal D2 correctly represents the blood vessel tissues.

When a negative result is also obtained here, at next step SP5, the control unit 12 executes the exposure time control process to set the reset timing of the solid imaging element 21E so as to obtain an optimal imaging sensitivity (exposure period t2 (FIG. 4)) of the solid imaging element 21E to the in vivo imaging target. At step SP6, the control unit 12 determines whether the blood vessel image of the digital blood vessel image signal D2 correctly represents the blood vessel tissues.

When a negative result is also obtained here, at next step SP7, the control unit 12 executes the three-dimensional DNR process until the noise component ratio of the blood vessel image of the digital blood vessel image signal D2 becomes a prescribed threshold value or lower, and moves to step SP8.

When an affirmative result is obtained at step SP2, SP4 or SP6, on the contrary, this means the initial set values set in the imaging unit 11 are set values at which the imaging condition for the in vivo imaging target (blood vessel tissues) is optimal, without executing the successive processes (the exposure time control process, the exposure control process, the auto focus process or the three-dimensional DNR process). At this time, the control unit 12 remains the initial set values the same and moves to step SP8.

At step SP8, the control unit 12 extracts the blood vessel formation pattern of a prescribed part from the blood vessel image of the digital blood vessel image signal D2 from the imaging unit 11 after the optimization process of steps SP1 to SP7, creates the first body identification information D3 from the extracted unique blood vessel formation pattern. At step SP9, the control unit 12 creates the second body identification information D4 from the various set parameters set in the imaging unit 11 at this time and the processing parameter (the number of times of the composition process) obtained through the three-dimensional DNR process executed in step SP7, registers the information in the internal memory BM, and then moves to step SP10 where this identification information creation procedure RT1 is completed.

As described above, the control unit 12 can create the in vivo imaging target (blood vessel tissues) and various parameters as the first and second body identification information D3 and D4, and register the information D3 and D4 in the internal memory BM in association with each other.

(3) Identification Process

Figure 7:
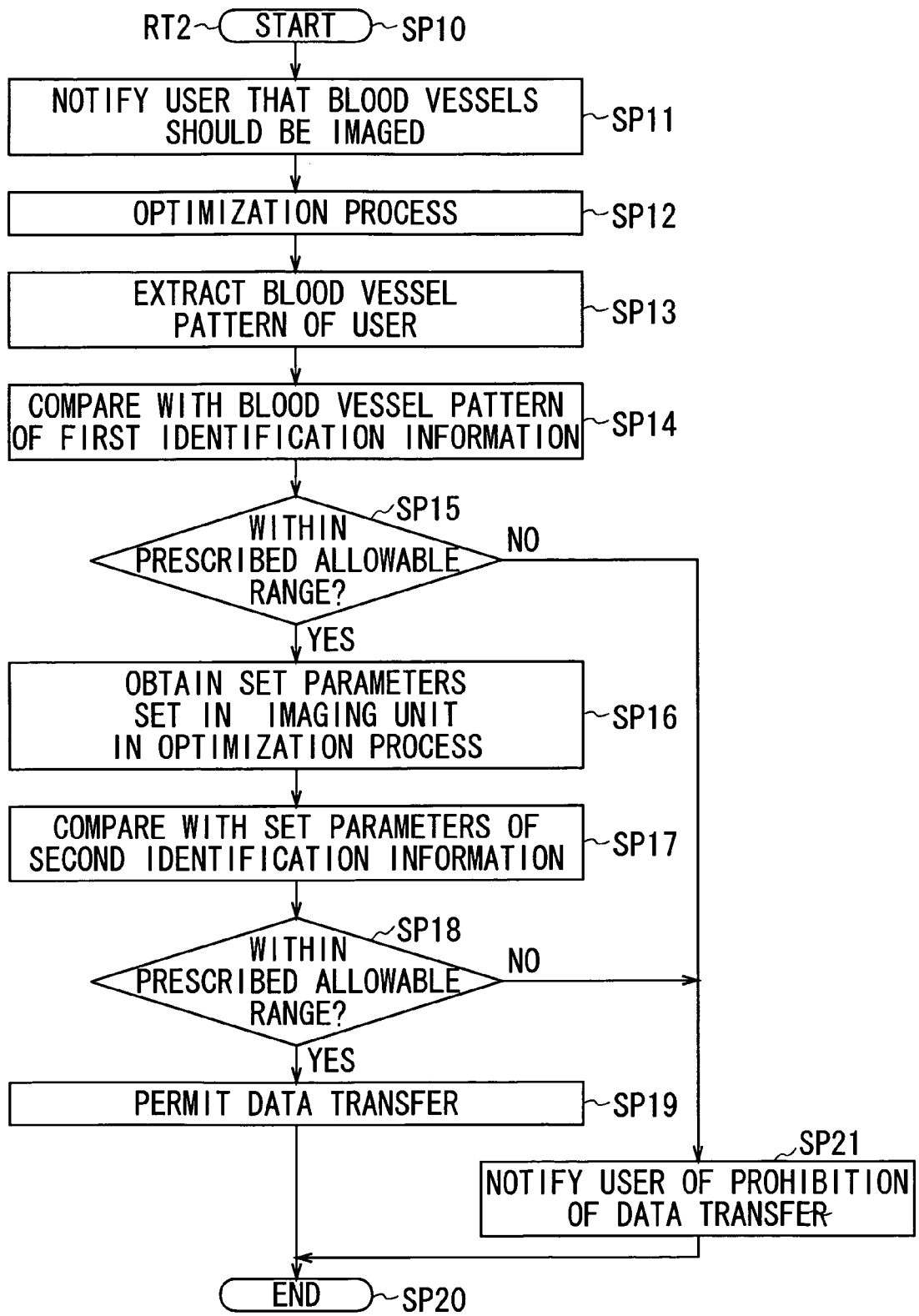
FIG. 7 is a flowchart showing an identification procedure.

The identification process using the first body identification information D3 and the second body identification information D4 registered in the internal memory BM through the identification information creation process is executed with an identification procedure RT2 shown in FIG. 7.

That is, when receiving a transfer command to transfer a digital subject signal D1 or other personal information being stored in the internal memory BM to outside of the identification apparatus 10 from the operating unit (not shown), the control unit 12 starts this identification procedure RT2 from step SP10. At step SP11, the control unit 12 asks a user operating the operating unit (not shown) via a display unit (not shown) that the finger FG (FIG. 3) as an imaging target should be placed at a prescribed position to image the blood vessels.

Then at step SP12, the control unit 12 executes the same optimization process as the process of the above steps SP1 to SP8. At step SP13, the control unit 12 extracts the blood vessel formation pattern of the blood vessel image of the user imaged by the imaging unit 23 after the process. At step SP14, the control unit 12 compares the blood vessel formation pattern of the user with the blood vessel formation pattern of first body identification information being registered in the internal memory BM, to calculate a correlation value between the blood vessel formation patterns, and determines at step SP15 whether the correlation value is within a preset allowable range.

When an affirmative result is obtained, this means that the user trying to transfer data is a rightful registrant with a high possibility. At this time, at step SP16, the control unit 12 obtains the set parameter data D11 to D13 set in the imaging unit 11 through the optimization process executed in step SP12 and the processing parameter D14 obtained as a result of the three-dimensional DNR process by the three-dimensional DNR processing unit 34.

Then at step SP17 the control unit 12 compares the parameters D11 to D14 with the corresponding parameter data D11 to D14 of the second body identification information D4 being registered in the internal memory BM to calculate a difference value. At step SP18 the control unit 12 determines whether this difference value is within a predetermined allowable range.

When an affirmative result is obtained, this means that the user trying to transfer data is not pretending he is a registrant by putting the blood vessels of the registrant on the identification apparatus 10 but is a rightful registrant. At this time the control unit 12 allows the transfer of the personal information being stored in the internal memory BM as a prescribed process at step SP19, and then moves on to step SP20 where this identification procedure RT2 is completed.

When a negative result is obtained at step SP15 or step SP18, on the contrary, this means that the user trying to transfer data is not a rightful registrant. At this time, at step SP21 the control unit 12 notifies the user via the display unit (not shown) that the data transfer of the personal information is not allowed, and then moves on to step SP20 where this identification procedure RT2 is completed.

As described above, the control unit 12 identifies a registrant with both the first body identification information D3 and the second body identification information D4, thereby being capable of preventing impersonation.

(4) Operation and Effects of this Embodiment

According to the above configuration, this identification apparatus 10 executes the optimization process so as to adjust the imaging condition of the imaging unit 11 to be optimal for an in vivo imaging target and so that the image condition of a blood vessel image becomes optimal, on the basis of the blood vessel image of a digital blood vessel image signal D2 received from the imaging unit 11 as a result of imaging.

Then the identification unit 10 creates the set parameters D11 to D13 which are set in the imaging unit 11 as a result of the optimization process and the processing parameter D14 which is obtained through the three-dimensional DNR process, as identification information D4.

Therefore, the identification apparatus 10 uses the parameters for avoiding image quality deterioration which occurs in a result of imaging the blood vessel tissues due to individuality of bodies, as information unique to a body, so that the identification information which provides adaptive imaging condition for the body and can be used for identification can be correctly created. In addition, this identification apparatus 10 does not require a special process to create identification information since the parameters are used as identification information, resulting in reducing processing loads.

In addition, in this case, this identification apparatus 10 creates the identification information D3 representing blood vessel tissues unique to a body obtained from the imaging unit 11 via the three-dimensional DNR processing unit 34 at a time of creating the identification information D4, to be associated with the identification information D4.

That is, this identification apparatus 10 creates both the identification information D3 and D4 which are associated with each other. Therefore, by executing the identification process with the identification information D3 and D4, the identification apparatus 10 surely avoid impersonation, as compared with a case of using only the identification information D3 representing blood vessel tissues.

According to the above configuration, the parameters which are different depending on individuality of bodies are used as identification information at a time of imaging an in vivo imaging target, which can not only avoid image quality deterioration which occurs in a result of imaging blood vessel tissues due to individuality of bodies but also surely create adaptive identification information for the body or execute the adaptive identification process for a body with the parameters, thus being capable of enhancing reliability of identification information itself or identification accuracy.

(5) Other Embodiments

Note that the above embodiment has described a case where the imaging unit 11 constructed as shown in FIG. 2 is applied as an imaging means for imaging a unique in vivo imaging target existing inside a body. This invention, however, is not limited to this and an imaging unit composed of near-infrared light sources LS and a CCD camera unit having another construction can be applied.

In this case, a finger of the body is used as the unique in vivo imaging target existing inside the body. This invention, however, is not limited to this and another part such as retina of the body or all body can be used.

Further, in this case, blood vessel tissues which have a specificity for near-infrared light are imaged. This invention, however, is not limited to this and unique tissues inside the body which have a specificity for the near-infrared light or another light can be imaged.

Further, the above embodiment has described a case in which the light source control unit 31 adjusts the luminance level of the near infrared light sources LS, the aperture/lens control unit 32 adjusts the amount of light which enters the aperture 21C and the focus distances of the lens 21A and 21B, and the imaging sensitivity control unit 33 adjusts the imaging sensitivity of the solid imaging element 21E, as optimization means for obtaining optimal imaging condition of the imaging means for an in vivo imaging target. This invention, however, is not limited to this and the imaging condition of other imaging means can be adjusted to be optimal, such as adjusting the filter coefficient of the filter 21D.

In this case, the luminance level of the near-infrared light sources LS, the amount of light entering the aperture 21C, the focus distance of lens 21A and 21B and the imaging sensitivity of the solid imaging element 21E are automatically controlled. These, however, can be adjusted manually.

Further, in this case, the set parameter D11 representing an output value set by adjusting the luminance level of the near-infrared light sources LS, the set parameter D12 representing an aperture value set by adjusting the amount of light entering the aperture 21C and the lens positions set by adjusting the focus distances of the lens 21A and 21B, and the set parameter D13 representing reset timing set by adjusting the imaging sensitivity of the solid imaging element 21E are applied as first parameters which are set in the imaging means as a result of adjustment by the optimization means. This invention, however, is not limited to this and other set parameters can be applied and further, at least one parameter is sufficient as the number of parameters to be applied.

Further, the above embodiment has described a case where the three-dimensional DNR process is applied as an optimization means for applying an image process so that the image condition of an image taken by the imaging means becomes optimal. This invention, however, other image processes such as an addition average process can be applied.

In this case, a processing parameter representing the number of times of the composition process applied to the digital blood vessel image signal D1 composed through the three-dimensional DNR process is applied as a second parameter which is obtained as a result of the image process by the optimization means. This invention, however, is not limited to this and other processing parameters can be applied, and at least one parameter is sufficient as the number of parameters to be applied.

Further, the above embodiment has described a case where the identification information processing unit 40 for creating identification information from an in vivo imaging target extracted from an image taken by the imaging means in the imaging condition adjusted by the optimization means, and first parameters and/or a second parameter is applied as an identification information creation means for creating first parameters and/or a second parameter as identification information. This invention, however, is not limited to this and an identification information processing unit for creating only first parameters and/or a second parameter as identification information can be applied.

Further, the above embodiment has described a case where the first and second identification information D3 and D4 are previously registered in the internal memory BM and at the time of transferring personal information being stored in the internal memory BM, the parameters obtained as a result of adjusting the imaging condition for a user and the blood vessel formation pattern extracted from the user are compared with corresponding first and second identification information D3 and D4 before the data transfer is allowed. This invention, however, is not limited to this and another identification process can be applied.

Specifically, the first and second parameters of the second identification information D4 are stored as comparison parameters in a portable memory CM, such as Memory Stick ™, when the first and second identification information D3 and D4 are registered in the internal memory BM or by another registration means. Then when the identification processing unit 40 detects that the portable memory CM has been inserted in a memory slot MS as a connection means, the comparison parameters being stored in the portable memory CM are compared with corresponding parameters of the second identification information D4 being stored in the internal memory BM.

When the comparison result is within an allowable range, a registrant is confirmed, and the parts 31 to 34 of the imaging control unit 30 are set with the comparison parameters and the imaging condition is immediately adjusted according to a user which is certified as the registrant. Then, the identification processing unit 40 compares the blood vessel formation pattern extracted from the user certified as the registrant with the first identification information D3. When the comparison result is within an allowable range, the registrant is finally confirmed, which allows the identification apparatus 20 to perform, for example, imaging in the normal imaging mode as a prescribed process.

By doing so, not only the imaging condition suitable for a body can be obtained immediately but also repeatability of a blood vessel image can be significantly enhanced, resulting in significantly improving the comparison accuracy in the identification process of the blood vessel formation pattern.

Furthermore, the above embodiment has described a case where the identification apparatus 20 is applied to execute the identification information creation process and the identification process. This invention, however, is not limited to this and an identification information creation apparatus for executing the identification information creation process and an identification processing apparatus for performing the identification process can be separately arranged. By doing so, they can be used in correspondence with the management mode and obtaining mode of identification information.

This invention can be used in a field using identification information, such as an electronic money field and a communication field.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An identification information creation apparatus comprising:
   means for imaging a unique in vivo imaging target existing inside a body;
   means for setting an exposure period of the means for imaging to less than an exposure period of a normal imaging mode based on imaging of the unique in vivo target;
   means for applying an image process to optimize the imaging of the unique in vivo target; and
   means for creating a first parameter set in the means for imaging as a result of adjustment by the means for setting and a second parameter obtained as a result of applying the image process by the means for applying, the first and second parameters identifying the body.

2. The identification information creation apparatus according to claim 1, wherein the in vivo imaging target extracted from an image taken by the means for imaging after setting of the exposure period and application of the image process, the first parameter and/or the second parameter are created as the identification information identifying the body.

3. The identification information creation apparatus according to claim 1, further comprising:
   means for irradiating the body with infrared light from a direction of the means for imaging; and
   means for controlling an intensity of the infrared light.

4. The identification information creation apparatus according to claim 1, further comprising:
   means for regulating an amount of light reaching the means for imaging.

5. An identification information creation method for causing an identification information creation apparatus to identify a body, the method comprising:
   setting an exposure period of an imaging unit to less than an exposure period in a normal imaging mode based on an imaging of a unique in vivo imaging target existing inside a body by an imaging unit;
   applying an image process, in a control unit, to optimize the imaging of the unique in vivo target by the imaging unit; and
   creating, in the control unit, a first parameter set in the imaging unit corresponding to the exposure period set and a second parameter that is obtained as a result of applying the image process, the first and second parameters being identification information to identify the body.

6. The identification information creation method according to claim 5, wherein the in vivo imaging target extracted from an image taken by the imaging unit after setting of the exposure period and application of the image process, the first parameter and/or the second parameter are created as the identification information.

7. The identification information creation method according to claim 5, further comprising:
   irradiating, from an infrared light source, the body with infrared light; and
   controlling, at a light source control unit, an intensity of the infrared light.

8. The identification information creation method according to claim 5, further comprising:
   regulating, at a lens control unit, an amount of light reaching the imaging unit.

9. An identification apparatus comprising:
   an imaging unit configured to image a unique in vivo imaging target existing inside a body;
   an exposure setting unit configured to set an exposure period of the imaging unit to less than an exposure period of a normal imaging mode based on the imaging of the unique in vivo target;
   a processing unit configured to apply an image process to optimize the imaging of the unique in vivo target; and
   an identification information processing unit configured to perform a prescribed identification process based on a first parameter is set in the imaging unit as a result of adjustment by the exposure setting unit and/or a second parameter obtained as a result of applying the image process.

10. The identification apparatus according to claim 9, wherein the identification information processing unit executes the identification process based on the in vivo imaging target extracted from an image taken by the imaging unit after setting of the exposure period and application of the image process in accordance with the first parameter and/or the second parameter.

11. The identification apparatus according to claim 10, comprising:
   an internal memory configured to store the in vivo imaging target as first identification information, and storing the first parameter and/or the second parameter as second identification information; and
   a memory slot configured to detachably connect to a carriable memory,
   wherein the identification information processing unit compares a first comparison parameter and/or a second comparison parameter stored in the carriable memory with corresponding second identification information stored in the internal memory, and when a comparison result is within a predetermined allowable range, the identification information processing unit sets the first comparison parameter in the imaging unit, and/or controls the processing unit to apply the image process based on the second comparison parameter.

12. The identification apparatus according to claim 11, wherein the identification information processing unit compares the image taken by the imaging unit set with the first comparison parameter, or the in vivo imaging target for comparison extracted from the image obtained as a result of applying the image process to the image based on the second comparison parameter, with the first identification information, and when a comparison result is within a predetermined allowable range, permits an additional predetermined process.

13. The identification apparatus according to claim 9, further comprising:
   an infrared light source configured to irradiate the body with infrared light from a direction of imaging unit; and
   a light source control unit configured to control an intensity of the infrared light.

14. The identification apparatus according to claim 9, further comprising:
   a lens control unit configured to regulate an amount of light reaching the imaging unit.

15. A method for causing an identification apparatus to identify a body, the method comprising:
   setting, in a means for setting, an exposure period a means for imaging to less than an exposure period of a normal imaging mode based on imaging of a unique in vivo imaging target existing inside the body;
   applying an image process, in a means for applying, to optimize the imaging of the unique in vivo target; and
   executing, in a means for executing, a predetermined identification process based on a first parameter set in the means for imaging as a result of the setting of the exposure and/or a second parameter obtained as a result of applying the image process.

16. The method according to claim 15, wherein the predetermined identification process is executed based on the in vivo imaging target extracted from an image taken by the means for imaging after setting of the exposure period, the first parameter and/or the second parameter.

17. The method according to claim 16, wherein, executing a predetermined identification process includes
   storing the in vivo imaging target as first identification information, and the first parameter and/or the second parameter as second identification information, in means for storing;
   comparing a first comparison parameter and/or a second comparison parameter stored in means for portable storing with corresponding second identification information stored in the means for storing; and
   setting the first comparison parameter in the means for imaging and/or performing applying the image process based on the second comparison parameter, when a comparison result in the first comparison step is within a predetermined allowable range.

18. The method according to claim 17, wherein executing a predetermined identification process further includes
   comparing the image taken by the means for imaging set with the first comparison parameter or the in vivo imaging target for comparison extracted from the image obtained as a result of applying the image process to the image based on the second comparison parameter, with the first identification information; and
   allowing an additional predetermined process, when a comparison of the image or the in vivo imaging target with the first identification information is within a predetermined allowable range.

19. The method according to claim 15, further comprising:
   irradiating, from a means for irradiating, the body with infrared light; and
   controlling, at a means for controlling, an intensity of the infrared light.

20. The method according to claim 15, further comprising:
   regulating, in a means for regulating, an amount of light reaching the means for imaging.

* * * * *